(12) United States Patent
Clarke

(10) Patent No.: US 6,516,599 B1
(45) Date of Patent: Feb. 11, 2003

(54) CORN HARVESTER WITH IMPROVED EAR PICKING MECHANISM

(76) Inventor: David Clarke, P.O. Box 694, Howard, SD (US) 57349

( * ) Notice: Subject to any disclaimer, the term of this patent is extended or adjusted under 35 U.S.C. 154(b) by 0 days.

(21) Appl. No.: 09/458,204

(22) Filed: Dec. 10, 1999

(51) Int. Cl.[7] ............................................... A01D 45/02
(52) U.S. Cl. ..................... 56/98; 56/66; 56/69; 56/75; 56/78; 56/111
(58) Field of Search .......................... 198/864.1; 56/119, 56/500, 94, 66, 59, 75, 78, 82, 88, 93, 98, 111, 118, 106, 69, 108, 503

(56) References Cited

U.S. PATENT DOCUMENTS

| | | | |
|---|---|---|---|
| 3,462,928 A | 8/1969 | Schreiner et al. ............. | 56/104 |
| 3,585,789 A | 6/1971 | Blanshine et al. ............ | 56/98 |
| 3,660,970 A * | 5/1972 | Waldrop ......................... | 56/98 |
| 3,961,466 A * | 6/1976 | Martin et al. ................. | 56/14.3 |
| 4,084,396 A * | 4/1978 | Fritz et al. .................... | 56/98 |
| 4,227,366 A * | 10/1980 | Pucher .......................... | 56/14.2 |
| 4,266,394 A * | 5/1981 | Van Ginhoven et al. ......... | 56/94 |
| 4,594,842 A * | 6/1986 | Wolters et al. ................. | 56/94 |
| 5,161,355 A * | 11/1992 | Diedrich, Jr. .................. | 56/51 |
| 5,330,114 A * | 7/1994 | Trenkamp et al. ........ | 241/101.7 |
| 6,032,444 A * | 6/1997 | Herron et al. ................. | 56/60 |
| 5,878,561 A * | 3/1999 | Gunn ............................. | 56/98 |
| 5,881,541 A * | 3/1999 | Silver et al. .................... | 56/98 |
| 5,924,269 A * | 7/1999 | McMillen ....................... | 56/66 |

* cited by examiner

*Primary Examiner*—Robert E. Pezzuto
*Assistant Examiner*—Árpád F. Kovács

(57) ABSTRACT

A grain harvesting mechanism having a pair of parallel chains running in vertically spaced planes is used to remove the ears of grain from the stalks. The spacing of the planes create a deeper channel for the ears to be carried in, thus preventing some spillage. The chains also run at differing speeds for removal and delivery of the ears.

19 Claims, 2 Drawing Sheets

CORN HARVESTER WITH IMPROVED EAR PICKING MECHANISM

BACKGROUND AND SUMMARY OF THE INVENTION

This invention pertains to corn harvesting machinery, and more particularly to a corn picking machine having a novel arrangement and drive for the gathering chain. The arrangement allows for higher forward speeds for the combine or tractor which provides the motion power and more efficient gathering of the corn crop.

Nearly all field corn is currently harvested mechanically, mostly by using a combine having a corn head. A small amount may be harvested by a picking device mounted on or pulled by a tractor. A minuscule amount may be harvested by hand in demonstrations or the like.

The mechanical devices are similar in that both the corn head on the combine and the picker use pointed row-separating apparatus to go between the rows and to pick up lodged stalks and to separate the rows. And both use similar gathering chain devices driven by sprockets to engage the ears and pull them from the stalks and to deliver the ear to be further processed by the machine. This further processing may be simply delivery to a wagon if the corn is to be stored on the ear, or the ear may be delivered to added machinery to be shelled and then delivered to a wagon if the corn is to be stored as shelled grain.

In either machine, the row separator must be properly spaced to accommodate the width of the rows as planted. In some instances, as yet rare, the plants are not set out in rows and, in those instances the points are closer together to make sure that plants do not get missed.

Any harvesting machine must be designed to minimize the dropping or missing of ears. Ears left in the field by the machines are not particularly useful to the farmer so the least possible droppage is desired. The same is true for the loss of kernels shelled off the ear in the finishing process.

By the present invention, the ears are more quickly handled and droppage is held to a minimum because of quicker and more certain moving of the ear from the stage of removal from the stalk to the husking stage of the process.

DESCRIPTION

Figure 1:
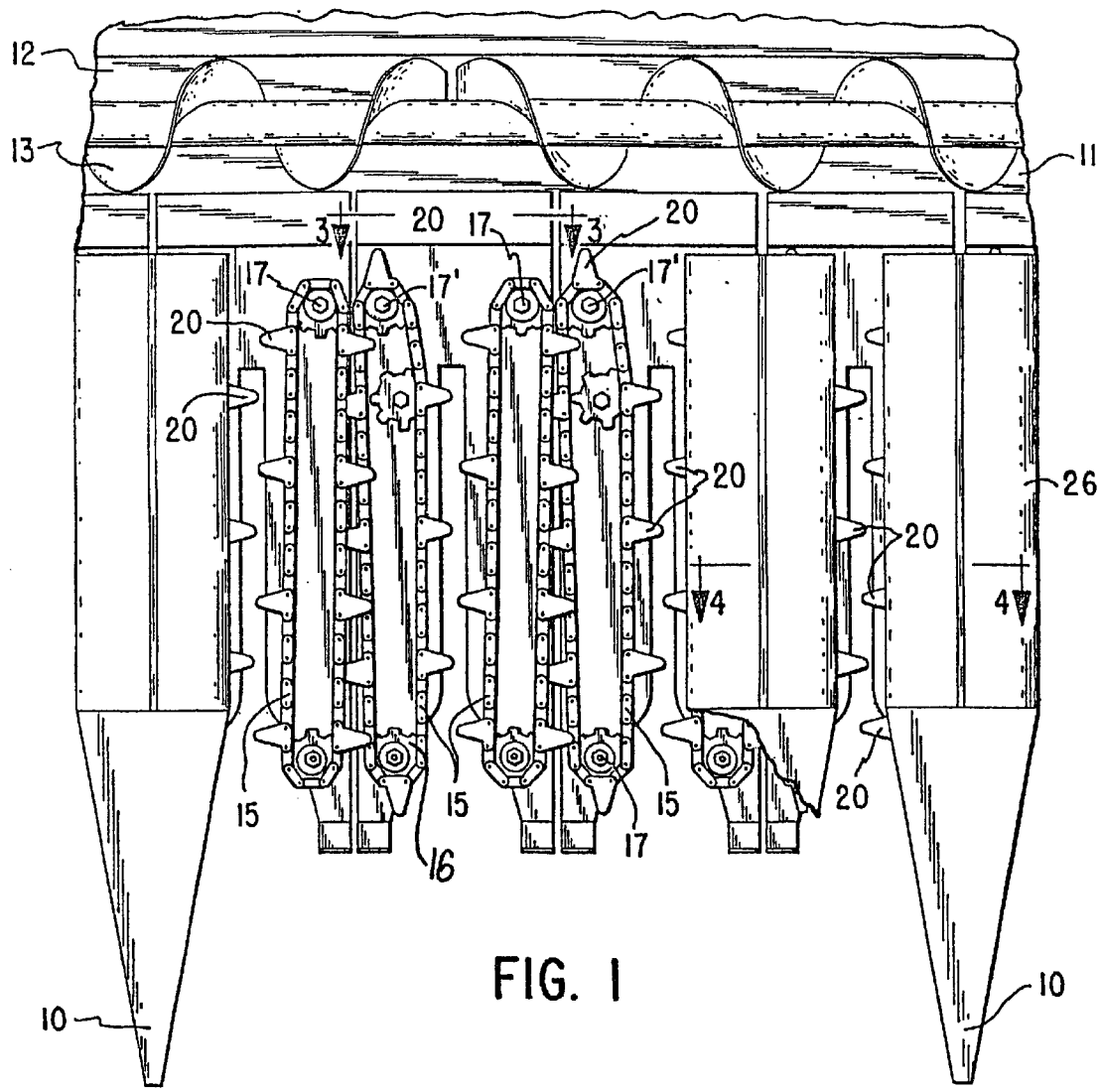
FIG. 1 is a top plan view of a portion of the picking mechanism with guards removed to show underlying parts.

Briefly, this invention comprises a corn harvesting device for breaking ears of corn from the corn stalk and delivering the ears to the husking machinery by a more complete and efficient device.

More specifically, and referring to the drawings, this invention is embodied in a corn head of the usual type having a series of parallel and forward pointing guide fingers 10 extending from a transverse frame 11. Also supported by the frame 11 is a delivery trough 12 in which an auger 13 runs to pick up the Marsh from the head as they are picked from the stalks. This auger then delivers the ears to the machinery which husks the ears. In combines the ears may also be shelled by additional machinery. None of the above described equipment is new and much of it is not shown in the figures.

The novel part of the device embodying the invention is related to the picking mechanism. Normally, the stalks are gathered between chains having picking fingers mounted on the chain to pull the ear from the stalk. In ordinary equipment, the chains run adjacent to each other in relatively shallow channels. Thus the ears are caught by chains running in the same plane and are carried up a sloping, channel into the trough 12.

Figure 2:
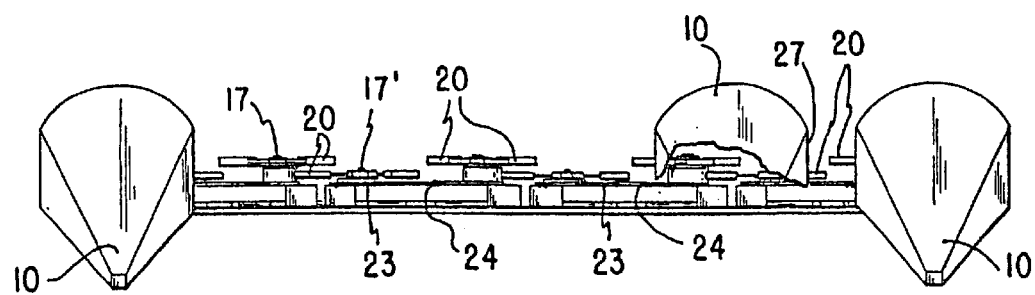
FIG. 2 is a front elevational view of the portion shown in FIG. 1.
Figure 3:
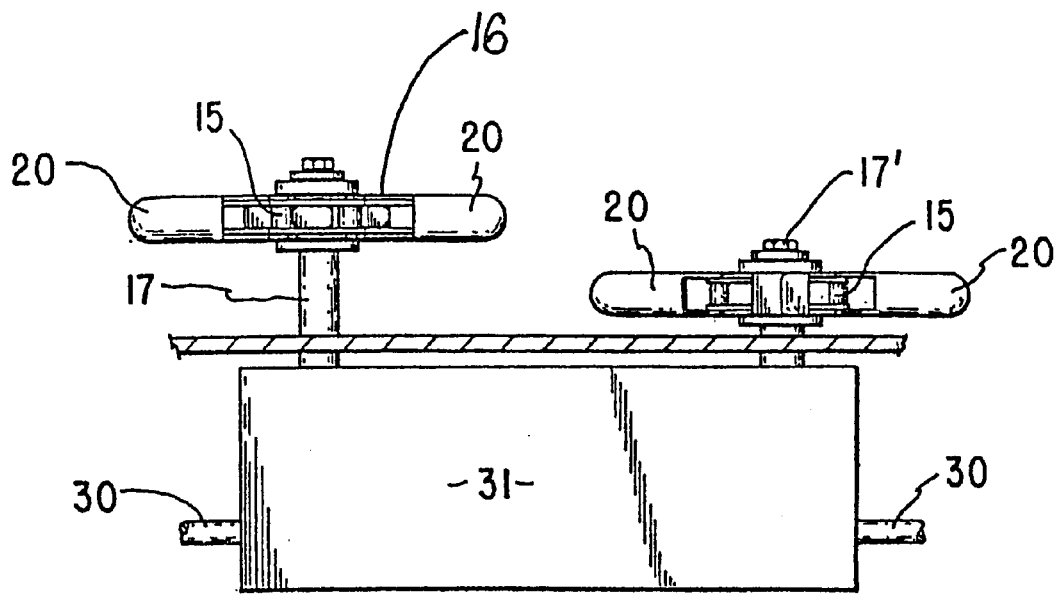
FIG. 3 is a detailed front elevational view of a pair of picking chains showing the relation between the chains, but omitting showing of the sprocket teeth.
Figure 4:
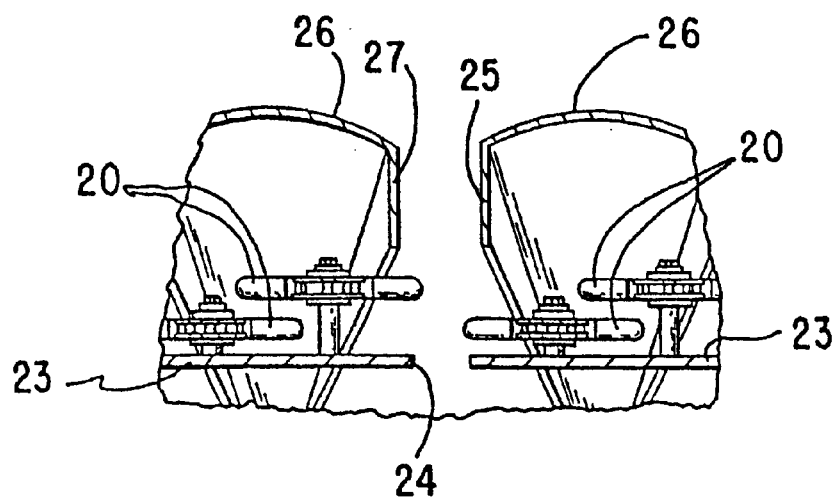
FIG. 4 is a detailed rear elevational view of the chains and the driving means which provide for the difference in speed between the chains.

In the novel device, flexible members form elongated loops, with each loop having one elongated side disposed in the space between the guide fingers 10 and another elongated side disposed within the guide fingers 10 (see FIGS. 1 and 2). Each of the loops of the flexible members lies in and thus defines a plane (see FIGS. 2 and 3). In the embodiment of the invention illustrated in the drawings, the flexible members each comprise a chain 15. The chains 15 are run on loop-shaping devices, or sprockets 16 [but adjacent] mounted on sprocket shafts 17 and 17'. Adjacent chains run in planes that are displaced axially relative to each other due to the relative positioning of the sprockets and the sprocket shafts 17 and 17'. This provides for the chains to run in substantially parallel but displaced planes. As shown in the front elevational view of FIG. 2, the plane of one of the adjacent elongated loops is oriented vertically above the plane of the other one of the adjacent elongated loops. As further shown in the front elevational view, in the illustrated embodiment, each of the planes are oriented substantially horizontal and substantially parallel to a ground surface over which the harvester travels. As shown in FIG. 1, each of the elongated sides of the elongated loops is substantially straight, and the elongated sides of the elongated loops disposed in the space between the guide fingers are substantially uniformly spaced from each other along substantially an entirety of a length of each of the elongated sides.

A plurality of moving fingers 20 are mounted on the chain 15 (see FIG. 1) at spaced or separated locations along the extent of the chain. The moving fingers 20 then also are carried through the displaced planes by the chain 15 allowing them to run at a narrower or even overlapping spacing without creating interference and possible damage. This spacing also provides a slightly different snapping action to pull the ears from the stalk. The ears may be at slightly different levels on the stalk and still be directly engaged by the teeth to provide an adequate snapping action.

It will be noted that beneath the chains 15 are rails 23 lying adjacent each other and thus providing a slot 24 through which the stalks of the grown plant slide as the ears are separated therefrom. The rails 23 together with the substantially vertical walls 25 of the guards 26 form a channel 27 in which the ears of corn are collected and up which the ears are carried to be dumped into the delivery trough 12. By displacing the chains 15, the channel 27 is necessarily somewhat deeper then would be used with chains 15 in the same planes. The added depth results in less spillage of ears. The usual depth the channel in devices with chains 15 in the same plane may be of the order of three inches. Experiments have this shown that by using chains in parallel planes, the channel must be about three to five times the distance between these planes or about nine to fifteen inches. Because the upper chain in the embodiment described is single, there is also reduced churning in the channel 27. This reduced disturbance also contributes to a reduced loss of ears thrown from the machine onto the ground.

In addition to the different planes in which the chains 15 run, the drives for the chains operate at different speeds. Thus the drive for the upper chain in each pair runs at a speed faster than the lower. The ideal speed variation appears to be about 25% faster for the upper chain although speeds within a range of variation of 15% to 33% are practical and do provide some of the same benefits as the suggested speed differences.

The device, or power transmission means, which provides for different speeds for the chains operates from the principal power source for the harvesters. This includes a power shaft 30 driven from that source and may be the same shaft as is used on the customary harvester. This shaft 30 drives a gear box 31 which includes gears to change the direction of motion to drive the vertically oriented shafts 17 and 17' and may also be geared up or down to provide for the varied speeds. Such gearing is well within the skill of any ordinary mechanic and thus is not shown in detail It will be recognized that a pair of shafts, like the shaft 30, but running at different speeds might also be used, or that various other driving devices such as chain and sprocket assemblies or belt drives either from the main power source or within the gear box 31 could be used to provide a similar result.

In use, the harvester is simply operated as a usual machine designed for the purpose. The result of such operation will be similar to that of the usual machine in the ears are removed from the stalks of corn and will be delivered to the delivery trough 12. However, that delivery will be more efficient with the machine described above than it would be in regular harvesters. The ear will probably be snapped from the stalk by a moving finger 20 on the upper chain 15 because these fingers travel past the stalk at a speed substantially greater then the moving finger on the lower chain. The ear then falls within the channel 27 to be engaged by the lower chain and be carried up to be deposited in the trough 12 for further processing. At this point it will be noted that the plurality of ears in the channel will not create a problem of churning and loss overboard because of the depth of the channel. Further, because the chains are going at different speeds, the upper levels of ears in the channel 27 will be carried away more quickly also reducing the volume of ears in the channel. It might also be noted that with the chains operating in different planes, the paths of the moving fingers 20 will overlap and thereby provide added coverage of the sweeping moving fingers across the channel 27.

Thus it is clear that by the expedients herein described, a mechanism is possible to harvest ears of corn more expeditiously and more efficiently than before.

I claim as my invention:

1. A mechanism for harvesting agricultural crops comprising a frame, said frame being adapted to be carried linearly through a field in an vertically-elevated condition above a ground surface in which said crop is growing, a plurality of guide fingers mounted in spaced apart parallel relationship on said frame, each guide finger having a lower pointed end and an upper delivery end, said guide fingers being pointed in the direction said frame is carried through said field, said spread apart relationship of said guide fingers creating a series of spaces between each adjacent pair of guide fingers, a pair of flexible members running from adjacent said lower end of said guide fingers toward said upper end, said pairs of flexible members being located in parallel planes that are vertically-spaced from each other with respect to the ground surface, said flexible members being used to move the ears of said crop upward toward said upper end of said guide fingers;

wherein each of said flexible members comprises an elongated loop having one elongated side disposed in said space between said guide fingers and another elongated side disposed in said guide fingers;

wherein each of said elongated sides of said elongated loops are substantially straight;

wherein said elongated sides of said elongated loops disposed in said space between said guide fingers are substantially uniformly spaced from each other along substantially an entirety of a length of each of said elongated sides.

2. The harvesting mechanism of claim 1 in which the planes of said flexible members are oriented substantially parallel to the ground surface.

3. The harvesting mechanism of claim 1 in which said elongated loop is driven from a first loop-shaping device at a first end of said elongated loop and is supported by a second loop-shaping device at a second end of said loop.

4. The harvesting mechanism of claim 1 in which said flexible member includes a flexible chain having engaging means for engaging a portion of the crop to be harvested, said engaging means extending at least partially across said space between said guide fingers.

5. The harvesting mechanism of claim 3 in which said flexible member comprises a chain, and said loop-shaping devices comprise sprockets engaging said chain to hold said chain in the loop formation.

6. The harvesting mechanism of claim 1 additionally comprising power transmission means for transmitting power to said flexible members, said power transmission means being adapted to turn said flexible member positioned in an upper one of said vertically spaced parallel planes at a speed faster than said flexible member positioned in a lower one of said parallel planes.

7. The harvesting mechanism of claim 6 in which said flexible member in said upper plane is turned by said power transmission means at a speed at least 1.15 times, the speed of said flexible member in said lower plane.

8. The harvesting mechanism of claim 2 in which a partial floor is located beneath said flexible members and extends into said space between said adjacent guide fingers to form a channel between said adjacent guide fingers, each of said guide fingers having a side face located adjacent to said floor, each of said side faces of said adjacent guide fingers forming a wall of said channel, one of said elongated sides of each adjacent said flexible members running within said channel, said walls of said channel having a vertical height at least three times a distance of the spacing between said vertically spaced planes.

9. A mechanism for harvesting agricultural crops comprising a frame, said frame being adapted to be carried linearly through a field in an vertically-elevated condition above a ground surface in which said crop is growing, a plurality of guide fingers mounted in spaced apart parallel relationship on said frame, each guide finger having a lower pointed end and an upper delivery end, said guide fingers being pointed in the direction said frame is carried through said field, said spread apart relationship of said guide fingers creating a series of spaces between each adjacent pair of guide fingers, a pair of flexible members running from adjacent said lower end of said guide fingers toward said upper end, said pairs of flexible members being located in parallel planes that are vertically-spaced from each other with respect to the ground surface, said flexible members being used to move the ears of said crop upward toward said upper end of said guide fingers;

wherein each of said flexible members comprises an elongated loop having one elongated side disposed in said space between said guide fingers and another elongated side disposed in said guide fingers;

wherein each of said elongated sides of said elongated loops are substantially straight;

wherein said elongated sides of said elongated loops disposed in said space between said guide fingers are substantially uniformly spaced from each other along substantially an entirety of a length of each of said elongated sides;

wherein the planes of said flexible members are oriented substantially parallel to the ground surface;

wherein said elongated loop is driven from a first loop-shaping device at a first end of said elongated loop and is supported by a second loop-shaping device at a second end of said loop;

wherein said flexible member includes a flexible chain having engaging means for engaging a portion of the crop to be harvested, said engaging means extending at least partially across said space between said guide fingers;

wherein said flexible member comprises a chain, and said loop-shaping devices comprise sprockets engaging said chain to hold said chain in the loop formation;

power transmission means for transmitting power to said flexible members, said power transmission means being adapted to turn said flexible member positioned in an upper one of said vertically spaced parallel planes at a speed faster than said flexible member positioned in a lower one of said parallel planes;

wherein said flexible member in said upper plane is turned by said power transmission means at a speed at least 1.15 times the speed of said flexible member in said lower plane; and wherein a partial floor is located beneath said flexible members and extends into said space between said adjacent guide fingers to form a channel between said adjacent guide fingers, each of said guide fingers having a side face located adjacent to said floor, each of said side faces of said adjacent guide fingers forming a wall of said channel, one of said elongated sides of each adjacent said flexible members running within said channel, said walls of said channel having a vertical height at least three times a distance of the spacing between said vertically spaced planes.

10. A mechanism for harvesting agricultural crops comprising:

a frame being adapted to be carried linearly through a field in an vertically-elevated condition above a ground surface in which said crop is growing;

a plurality of guide fingers mounted in spaced apart parallel relationship on said frame, each guide finger having a lower pointed end and an upper delivery end, said guide fingers being pointed in the direction said frame is carried through said field, said spaced apart relationship of said guide fingers creating a series of spaces between each adjacent pair of guide fingers;

a pair of flexible members running from adjacent said lower end of said guide fingers toward said upper end, said pairs of flexible members being located in parallel planes that are vertically-spaced from each other with respect to the ground surface, said flexible members being used to move the ears of said crop upward toward said upper end of said guide fingers; and power transmission means for transmitting power to said flexible members, said power transmission means being adapted to turn said flexible member positioned in an upper one of said vertically spaced parallel planes at a speed relatively faster than said flexible member positioned in a lower one of said parallel planes.

11. The harvesting mechanism of claim 10 in which said flexible member in said upper plane is turned by said power transmission means at a speed at least 1.15 times a speed of said flexible member in said lower plane.

12. The harvesting mechanism of claim 10 in which said flexible member in said upper plane is turned by said power transmission means at a speed in the range between approximately 1.15 times and approximately 1.33 times a speed of said flexible member in said lower plane.

13. The harvesting mechanism of claim 10 in which said flexible member in said upper plane is turned by said power transmission means at a speed approximately 1.25 times a speed of said flexible member in said lower plane.

14. The harvesting mechanism of claim 10 wherein each of said flexible members comprises an elongated loop having one elongated side disposed in said space between said guide fingers and another elongated side disposed in said guide fingers, each of said elongated sides of said elongated loops are substantially straight, and said elongated sides of said elongated loops disposed in said space between said guide fingers are substantially uniformly spaced from each other along substantially an entirety of a length of each of said elongated sides.

15. The harvesting mechanism of claim 10 in which the planes of said flexible members are oriented substantially parallel to the ground surface.

16. The harvesting mechanism of claim 10 in which said elongated loop is driven from a first loop-shaping device at a first end of said elongated loop and is supported by a second loop-shaping device at a second end of said loop.

17. The harvesting mechanism of claim 10 in which said flexible member includes a flexible chain having engaging means for engaging a portion of the crop to be harvested, said engaging means extending at least partially across said space between said guide fingers.

18. The harvesting mechanism of claim 17 in which said flexible member comprises a chain, and said loop-shaping devices comprise sprockets engaging said chain to hold said chain in the loop formation.

19. The harvesting mechanism of claim 10 in which a partial floor is located beneath said flexible members and extends into said space between said adjacent guide fingers to form a channel between said adjacent guide fingers, each of said guide fingers having a side face located adjacent to said floor, each of said side faces of said adjacent guide fingers forming a wall of said channel, one of said elongated sides of each adjacent said flexible members running within said channel, said walls of said channel having a vertical height at least three times a distance of the spacing between said vertically spaced planes.

* * * * *